(12) United States Patent
Zhao

(10) Patent No.: US 7,609,364 B2
(45) Date of Patent: Oct. 27, 2009

(54) LASER DISTANCE FINDER

(75) Inventor: Yuzhong Zhao, Nanjing (CN)

(73) Assignee: Chervon Limited, Hong Kong (CN)

( * ) Notice: Subject to any disclaimer, the term of this patent is extended or adjusted under 35 U.S.C. 154(b) by 55 days.

(21) Appl. No.: 12/006,527

(22) Filed: Jan. 3, 2008

(65) Prior Publication Data

US 2008/0174760 A1    Jul. 24, 2008

(30) Foreign Application Priority Data

Jan. 19, 2007    (CN) .................. 2007 2 0033620 U

(51) Int. Cl.
*G01C 3/08* (2006.01)

(52) U.S. Cl. .................... 356/4.01; 356/4.03

(58) Field of Classification Search ....... 356/4.01–5.15, 356/28; 396/110, 116
See application file for complete search history.

(56) References Cited

U.S. PATENT DOCUMENTS

| | | | |
|---|---|---|---|
| 3,442,193 A * | 5/1969 | Pagel | .................. 396/110 |
| 3,691,850 A | 9/1972 | Slater et al. | |
| 3,759,616 A | 9/1973 | Hildebrand | |
| 4,247,809 A | 1/1981 | Nessel | |
| 4,676,103 A | 6/1987 | Nakajima | |
| 4,718,171 A | 1/1988 | Schlemmer et al. | |
| 4,751,782 A | 6/1988 | Ammann | |
| 4,781,457 A | 11/1988 | Hirano et al. | |
| 4,830,489 A | 5/1989 | Cain et al. | |
| 4,852,265 A | 8/1989 | Rando et al. | |
| 4,854,703 A | 8/1989 | Ammann | |
| 4,912,851 A | 4/1990 | Rando et al. | |
| 4,993,161 A | 2/1991 | Borkovitz | |
| 5,063,679 A | 11/1991 | Schwandt | |
| 5,075,977 A | 12/1991 | Rando | |
| 5,144,487 A | 9/1992 | Hersey | |
| 5,148,018 A | 9/1992 | Ammann | |
| 5,182,863 A | 2/1993 | Rando | |
| 5,218,770 A | 6/1993 | Toga | |

(Continued)

FOREIGN PATENT DOCUMENTS

CA    2300241    9/2000

(Continued)

OTHER PUBLICATIONS

Published UK Patent Application and UK Search Report for related UK Application No. GB0722833.1.

*Primary Examiner*—Isam Alsomiri
(74) *Attorney, Agent, or Firm*—McDermott Will & Emery LLP

(57) ABSTRACT

A compact, power-saving laser distance finder with high accuracy is disclosed having a laser generating device, a collimating lens in an emitting end direction of the laser generating device, a receiving lens, an optoelectronic detector, a reflective member rotatably mounted on an optical path of the collimating measuring beam via a rotating shaft and being capable of rotating to a blocking position and an non-blocking position. There is a transmission part on one end of the reflective member, the transmission part has an interval apart from an axis of the rotating shaft and engages with teeth of a worm driven by motor. When the reflective member reaches a predetermined position, it can be kept at that position through self-locking of the engagement between the worm's teeth and the transmission part without supplying power to the motor continuously, and a distance measuring is carried out and accuracy ensured.

5 Claims, 1 Drawing Sheet

U.S. PATENT DOCUMENTS

| | | |
|---|---|---|
| 5,249,013 A * | 9/1993 | Demura et al. ............... 396/116 |
| 5,287,627 A | 2/1994 | Rando |
| D348,227 S | 6/1994 | Nielsen et al. |
| 5,331,395 A | 7/1994 | Piske et al. |
| 5,367,779 A | 11/1994 | Lee |
| 5,400,514 A | 3/1995 | Imbrie et al. |
| 5,446,635 A | 8/1995 | Jehn |
| D363,240 S | 10/1995 | Hirakawa et al. |
| 5,459,932 A | 10/1995 | Rando et al. |
| 5,485,266 A | 1/1996 | Hirano et al. |
| 5,500,524 A | 3/1996 | Rando |
| 5,519,942 A | 5/1996 | Webb |
| 5,524,352 A | 6/1996 | Rando et al. |
| D371,309 S | 7/1996 | Webb |
| 5,531,031 A | 7/1996 | Green |
| 5,539,990 A | 7/1996 | Le |
| 5,541,727 A | 7/1996 | Rando et al. |
| 5,561,911 A | 10/1996 | Martin |
| 5,572,797 A | 11/1996 | Chase |
| D376,111 S | 12/1996 | Ishii |
| 5,581,034 A | 12/1996 | Dao et al. |
| 5,594,993 A | 1/1997 | Tager et al. |
| 5,604,987 A | 2/1997 | Cupp |
| 5,617,202 A | 4/1997 | Rando |
| 5,621,975 A | 4/1997 | Rando |
| 5,636,018 A | 6/1997 | Hirano et al. |
| D383,075 S | 9/1997 | Sawaguchi et al. |
| D389,758 S | 1/1998 | Motamed |
| 5,742,387 A | 4/1998 | Ammann |
| 5,745,623 A | 4/1998 | Ohtomo et al. |
| 5,754,582 A | 5/1998 | Dong |
| 5,760,932 A | 6/1998 | Perchak |
| 5,784,792 A | 7/1998 | Smith |
| D396,817 S | 8/1998 | Webb |
| D397,627 S | 9/1998 | Webb |
| 5,815,251 A | 9/1998 | Ehbets et al. |
| D399,145 S | 10/1998 | Ho |
| 5,819,424 A | 10/1998 | Ohtomo et al. |
| 5,836,081 A | 11/1998 | Orosz, Jr. |
| 5,838,431 A | 11/1998 | Hara et al. |
| D402,218 S | 12/1998 | Kennison |
| 5,842,282 A | 12/1998 | Ting |
| 5,864,956 A | 2/1999 | Dong |
| 5,872,657 A | 2/1999 | Rando |
| 5,898,490 A | 4/1999 | Ohtomo et al. |
| D409,508 S | 5/1999 | Gallagher |
| D411,470 S | 6/1999 | Webb |
| 5,907,907 A | 6/1999 | Ohtomo et al. |
| 5,914,778 A | 6/1999 | Dong |
| D411,809 S | 7/1999 | Wakabayashi |
| D412,857 S | 8/1999 | Howard et al. |
| 5,946,087 A | 8/1999 | Kasori et al. |
| D415,436 S | 10/1999 | Martone |
| 5,960,551 A | 10/1999 | Nishi et al. |
| 5,966,826 A | 10/1999 | Ho |
| D416,856 S | 11/1999 | Onose |
| 5,983,510 A | 11/1999 | Wu et al. |
| 5,992,029 A | 11/1999 | Dong |
| D417,633 S | 12/1999 | Sato et al. |
| 6,005,719 A | 12/1999 | Rando |
| D418,432 S | 1/2000 | Krantz |
| D418,433 S | 1/2000 | Krantz |
| D418,434 S | 1/2000 | Krantz |
| D418,763 S | 1/2000 | Krantz |
| 6,009,630 A | 1/2000 | Rando |
| 6,012,229 A | 1/2000 | Shino |
| 6,014,211 A | 1/2000 | Middleton et al. |
| D420,972 S | 2/2000 | Brecher et al. |
| 6,055,046 A | 4/2000 | Cain |
| 6,065,217 A | 5/2000 | Dong |
| 6,073,353 A | 6/2000 | Ohtomo et al. |
| D429,481 S | 8/2000 | Ishii |
| 6,133,996 A | 10/2000 | Plumb et al. |
| 6,151,106 A | 11/2000 | Ohtomo et al. |
| 6,151,787 A | 11/2000 | Wright et al. |
| 6,163,969 A | 12/2000 | Jan et al. |
| 6,167,630 B1 | 1/2001 | Webb |
| 6,178,649 B1 | 1/2001 | Wu |
| 6,184,979 B1 | 2/2001 | Hirano et al. |
| 6,195,902 B1 | 3/2001 | Jan et al. |
| 6,202,312 B1 | 3/2001 | Rando |
| 6,209,219 B1 | 4/2001 | Wakefield et al. |
| 6,222,625 B1 | 4/2001 | Johnston |
| 6,249,338 B1 | 6/2001 | Ohtomo et al. |
| 6,249,983 B1 | 6/2001 | Wright et al. |
| 6,262,801 B1 | 7/2001 | Shibuya et al. |
| 6,293,024 B1 | 9/2001 | Fiebig et al. |
| 6,351,890 B1 | 3/2002 | Williams |
| 6,360,446 B1 | 3/2002 | Bijawat et al. |
| D455,664 S | 4/2002 | Webb |
| D457,446 S | 5/2002 | Kallabis |
| 6,407,803 B1 | 6/2002 | Schrank |
| D460,924 S | 7/2002 | Hitchcock |
| D461,135 S | 8/2002 | Watson et al. |
| 6,427,348 B1 | 8/2002 | Webb |
| 6,430,823 B1 | 8/2002 | Seki |
| 6,449,856 B1 | 9/2002 | Matsumoto et al. |
| D464,578 S | 10/2002 | Zurwelle |
| 6,459,483 B1 | 10/2002 | Shafer et al. |
| 6,487,783 B1 | 12/2002 | Thomas, Jr. |
| 6,493,067 B1 | 12/2002 | Kodaira et al. |
| 6,493,955 B1 | 12/2002 | Moretti |
| D469,369 S | 1/2003 | Durkin |
| D469,556 S | 1/2003 | Malard et al. |
| D469,738 S | 2/2003 | Ishii |
| D470,423 S | 2/2003 | Loudenslager et al. |
| D470,424 S | 2/2003 | Hand et al. |
| 6,532,676 B2 | 3/2003 | Cunningham |
| 6,556,283 B2 | 4/2003 | Shirai et al. |
| D474,985 S | 5/2003 | Cooper et al. |
| D475,938 S | 6/2003 | Lopano |
| 6,577,388 B2 | 6/2003 | Kallabis |
| D476,584 S | 7/2003 | Zurwelle |
| 6,606,798 B2 | 8/2003 | El-Katcha et al. |
| 6,735,879 B2 | 5/2004 | Malard et al. |
| 6,739,062 B2 | 5/2004 | Jan et al. |
| 6,829,834 B1 | 12/2004 | Krantz |
| 6,914,930 B2 | 7/2005 | Raskin et al. |
| 6,989,890 B2 * | 1/2006 | Riegl et al. ................. 356/5.01 |
| 7,460,215 B2 * | 12/2008 | Ehbets ...................... 356/4.01 |
| 2002/0073561 A1 | 6/2002 | Liao |
| 2002/0166249 A1 | 11/2002 | Liao |
| 2002/0178596 A1 | 12/2002 | Malard |
| 2004/0123473 A1 | 7/2004 | Malard et al. |
| 2004/0187327 A1 | 9/2004 | Levine |
| 2005/0066533 A1 | 3/2005 | Wheeler et al. |
| 2005/0078303 A1 | 4/2005 | Murray |

FOREIGN PATENT DOCUMENTS

| | | |
|---|---|---|
| CN | 96209131.6 | 3/1998 |
| DE | 3730548 | 3/1989 |
| DE | 197 41 726 | 9/1997 |
| EP | 0 735 505 | 10/1996 |
| EP | 0793117 | 3/1997 |
| GB | 2 281 714 | 3/1995 |
| JP | 361100436 | 5/1986 |
| JP | 11-174154 | 2/1999 |
| WO | WO 93/20458 | 10/1993 |
| WO | WO 00/73989 | 12/2000 |
| WO | WO 01/13320 | 2/2001 |
| WO | WO 02/067190 A3 | 8/2002 |
| WO | WO 2003/074970 | 9/2003 |

* cited by examiner

LASER DISTANCE FINDER

CROSS-REFERENCE TO RELATED APPLICATION

This application claims priority under 35 U.S.C. § 119 of Chinese Application 200720033620.0, filed Jan. 19, 2007, which is hereby incorporated by reference.

FIELD OF THE INVENTION

The present invention relates to a distance finder, and more particularly to a laser distance finder for measuring a distance via using light waves.

BACKGROUND OF THE INVENTION

Laser distance finders have advantages of being convenient for use, high accuracy, and short measuring time. Laser distance finders are widely used in a variety of applications, such as architecture, exploration, construction and so on.

A known laser distance finder usually comprises a laser generating device, a collimating lens positioned at an emitting end of the laser generating device for converting a laser beam generated from the laser generating device into a collimating measuring beam, a receiving lens disposed on one side of the laser generating device for receiving a reflected measuring beam from an object to be measured and focusing it into an image, an optoelectronic detector disposed in the distance finder for receiving the image of the reflected measuring beam and converting optical signals therein into corresponding electrical signals which is processed to obtain a distance measuring result.

The distance measuring result derived from the electrical signals converted from the optical signals received by the optoelectronic detector contains a distance by which the measuring beam is transmitted in the distance finder. And during the distance measuring, an accuracy of the measuring result is directly affected by drift errors of electrical signals transferred in circuit which are caused by self-heating of electronics elements of the circuit and environmental temperature influences. Therefore, an internal reference distance having a known length is provided in the distance finder to improve the measuring accuracy, and a reflective member is arranged in an optical path of the collimating measuring beam. When measuring an external distance, the reflective member is on a non-blocking position so that the collimating measuring beam is allowed to be projected out of the distance finder. When measuring the internal reference distance, the reflective member is on a blocking position to reflect the collimating measuring beam in the distance finder to form an internal optical path.

A button directly connected to the reflective member is provided in the conventional laser distance finder for a user to manually change the positions of the reflective member, which is inconvenient. In some other optical distance finders, a motor is provided to drive the reflective member to swivel, continuously supplying power to provide current to the motor so that the reflective member can be kept in a desired position when the reflective member is swiveled onto the desired position. This device consumes a great deal of power and is particularly disadvantageous to the distance finder mainly powered by battery cells. In addition, the laser distance finder is so sensitive that the current continuously provided to the motor will influence the measuring result, reducing the measuring accuracy.

SUMMARY OF THE INVENTION

An object of the present invention is to overcome the disadvantages in the prior art to provide a compact, power-saving and precise measurement laser distance finder by improving a rotation driving structure for a reflective member.

The present invention provides a laser distance finder comprising a laser generating device, a collimating lens positioned in an emitting end direction of the laser generating device for converting a laser beam generated from the laser generating device into a collimating measuring beam, a receiving lens for receiving a reflected measuring beam from an object to be measured and focusing it into an image, an optoelectronic detector disposed in the distance finder for receiving the image of the reflected measuring beam, a reflective member rotatably mounted in a optical path of the collimating measuring beam via a rotating shaft and being capable of rotating to a blocking position and a non-blocking position around the rotating shaft. A transmission part locates at one end of the reflective member, the transmission part having an interval apart from an axis of the rotating shaft. A worm having a plurality of teeth is connected to a motor. The transmission part engages with the teeth of the worm.

Engagement of the worm's teeth and the transmission part results in a self-locking feature. Thus, when the reflective member reaches a predetermined position, it can be kept on in that position without supplying power to the motor continuously. In this manner, saving power is advantageous for a portable laser distance finder powered primarily by battery cells. In addition, the measuring accuracy of the device, which is affected by current continuously supplied to the motor during the measuring process, is preserved.

BRIEF DESCRIPTION OF THE DRAWINGS

The present invention is described detailed in conjunction of the drawings.

DETAILED DESCRIPTION OF THE PREFERRED EMBODIMENTS

Figure 1:
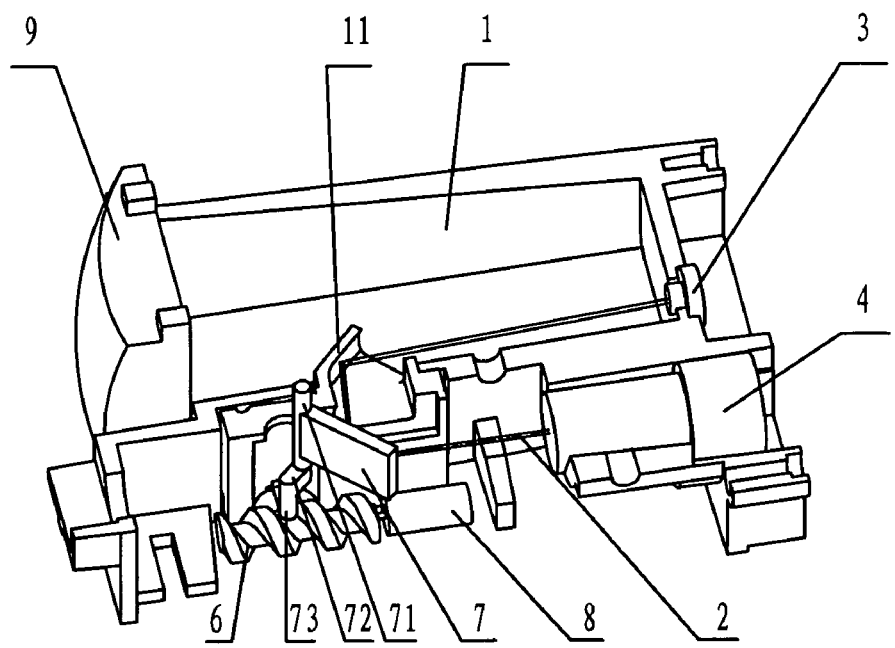
FIG. 1 is a perspective view of a preferred embodiment of the present invention.

In a laser distance finder of a preferred embodiment of the present invention shown in FIG. 1, a laser diode (LD) module 4 for emitting a collimating measuring beam 2 is fixedly mounted at one end of a brace 1. A laser generating device is mounted in the LD module 4, and a collimating lens is disposed in an emitting end direction of the laser generating device. The laser generating device and the collimating lens can be mounted on the brace directly. A receiving lens 9 disposed on one side of the LD module 4 is mounted at a front end of the brace 1, and an optoelectronic detector 3 located at a focus point of the receiving lens 9 is mounted at a back end of the brace 1. In the preferred embodiment, the receiving lens 9 is a convex lens, while in other embodiments the receiving lens 9 can be any other suitable lens. The optoelectronic detector 3 may be avalanche photodiode, or PIN photodiode, or other detecting elements or devices. In other embodiments, the laser generating device and/or the collimating lens can be disposed on the optical axis of the receiving lens 9.

Referring to FIG. 1, in the preferred embodiment, a reflective member 7 is mounted on a transmission optical path of the collimating measuring beam 2. One end portion of the reflective member 7, which is used as a rotating shaft 71, is mounted on the brace 1. The pin 73 has an interval apart from an axis of the rotating shaft 71. A worm 6 having a plurality of teeth is connected to an output shaft of a motor 8 directly, and an axis of the worm 6 is parallel to the emitting direction of the collimating measuring beam 2. In other embodiments, the worm can be connected to the motor indirectly via connection of transmission means. A driving arm 72 projects laterally from a bottom of the rotating shaft 71, and a pin 73 on a projecting end of the driving arm 72 is inserted into a recess part of teeth of a worm 6.

Figure 2:
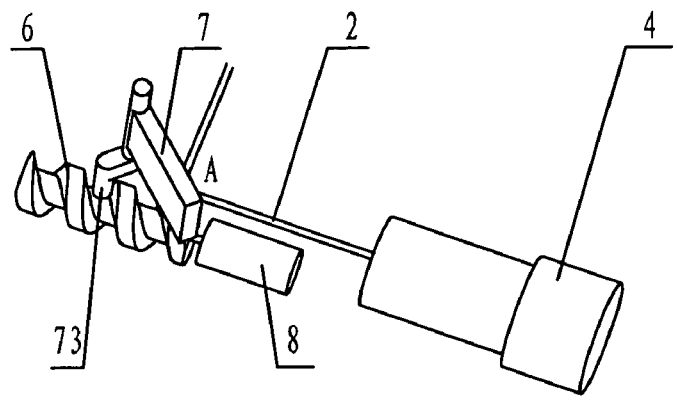
FIG. 2 is a perspective view of a reflective member shown in FIG. 1 being disposed on an internal optical path.
Figure 3:
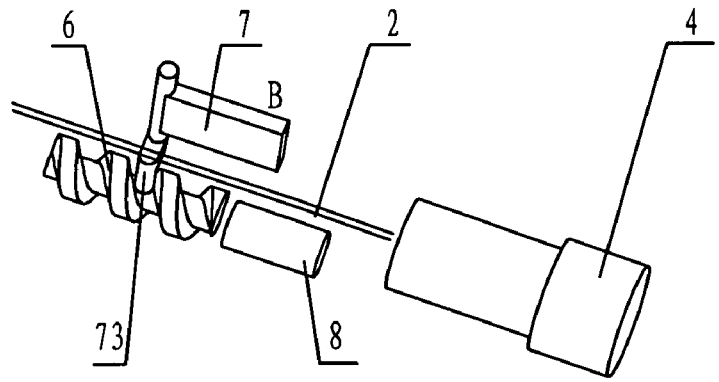
FIG. 3 is a perspective view of a reflective member shown in FIG. 1 being disposed on an external optical path.

The pin 73 moves in the recess part of the teeth of the worm 6 while the worm 6 is driven by the motor 8 to rotate. Since there is an interval between the pin 73 and the axis of the rotating shaft 71, movement of the pin 73 causes the reflective member 7 to rotate about the rotating shaft 71. The reflective member 7 rotates between a blocking position A shown in FIG. 2 and a non-blocking position B shown in FIG. 3 when the motor 8 rotates in a positive direction or a negative direction. The motor 8 stops when the reflective member 7 reaches position A or position B, and the reflective member 7 will be kept in that position because of the self-locking feature of the engagement between the worm's teeth and the pin 73. The motor 8 is started again when the position of the reflective member 7 needs to be changed. When the reflective member 7 is in blocking position A, it blocks the collimating measuring beam 2 and reflects it to a reflective element 11 located on the brace 1 so that the collimating measuring beam 2 is then reflected by the reflective element 11 again to reach the optoelectronic detector 3, which forms an internal optical path. When the reflective member 7 is in non-blocking position B, the collimating measuring beam 2 is projected out of the laser distance finder directly forming an external optical path.

Since engagement of the worm's teeth and pin 73 results in a self-locking feature when the reflective member reaches the predetermined position A or B, the reflective member can be kept at that position without supplying power to the motor continuously, and a distance measurement is carried through. The measuring accuracy, which is dependent on continuous current supplied to the motor during the measuring process is not affected, greatly saving power. This power saving feature is particularly advantageous for a portable laser distance finder that depends mainly on power from battery cells.

It can be easily understood for those ordinary skilled in the art that the pin used as the transmission part between the reflective member and the worm can be replaced by other components with different shape and form. For example, a V-shaped groove formed on the projecting end of the driving arm can be arranged to engage with the protruding part of the worm's teeth, acting in the same manner as the engagement of the pin and the recess part of the teeth.

A small motor can be used in the present invention so as to make the laser distance finder more compact, light weight and portable.

The above described preferred embodiments and drawings are intended to illuminate the principle of the present invention, but not to limit its scope. It can be easily understood for those ordinary skilled in the art that many other modifications and variations of the preferred embodiments will be apparent and may be made without departing from the spirit and the scope of the invention as defined in the following claims.

I claim:

1. A laser distance finder, comprising:
   a laser generating device;
   a collimating lens positioned in an emitting end direction of the laser generating device for converting a laser beam generated from the laser generating device into a collimating measuring beam;
   a receiving lens for receiving a reflected measuring beam from an object to be measured and focusing it into an image;
   an optoelectronic detector for receiving the image;
   a reflective member rotatably mounted on an optical path of the collimating measuring beam via a rotating shaft and being capable of rotating to a blocking position and a non-blocking position around the rotating shaft;
   a transmission part positioned on one end of the reflective member, the transmission part having an interval apart from an axis of the rotating shaft;
   a worm having a plurality of teeth, wherein the transmission part engages with the teeth of the worm.

2. A laser distance finder as claimed in claim 1, wherein the optoelectronic detector locates at a focus point of the receiving lens.

3. A laser distance finder claimed in claim 1, wherein one end of the worm is connected to an output shaft of a motor.

4. A laser distance finder as claimed in claim 1, wherein the transmission part of the reflective member is a pin which is inserted into a recess part of the teeth of the worm.

5. A laser distance finder as claimed in claim 1, wherein the transmission part of the reflective member has a groove which engages with a protruding part of the teeth of the worm.

\* \* \* \* \*